United States Patent

[11] 3,585,495

[72] Inventors Moritada Kubo
Tokyo;
Kuniji Asano, Kawasaki-shi, both of, Japan
[21] Appl. No. 840,422
[22] Filed July 9, 1969
[45] Patented June 15, 1971
[73] Assignee Tokyo Shibaura Electric Co., Ltd.
Kowasaki-shi, Japan
[32] Priority July 12, 1968, July 12, 1968
[33] Japan
[31] 43/48460 and 43/48461

[54] METHOD AND APPARATUS FOR DETECTING DURING OPERATION THE DEGREE OF ELONGATION OF ROLLED MAGNETIC METAL STRIPS
10 Claims, 12 Drawing Figs.
[52] U.S. Cl. ............................................. 324/34R,
33/147, 33/174, 72/11
[51] Int. Cl. ..................................................... G01r 33/12
[50] Field of Search .......................................... 324/34, 61,
65; 33/147 L, 147 N, 172 E, 174 L; 250/219 DF;
72/11

[56] References Cited
UNITED STATES PATENTS
3,256,610 6/1966 Brys ............................. 324/34 X
3,502,968 3/1970 Tobin, Jr. et al. ............. 324/40

*Primary Examiner*—Rudolph V. Rolinec
*Assistant Examiner*—R. J. Corcoran
*Attorney*—Flynn and Frishauf

ABSTRACT: A method and apparatus for detecting during operation the degree of elongation of rolled magnetic metal strips which consists in arranging at a prescribed interval at the outlet side of a work roll assembly in the travelling direction of the metal strip at least two induction detectors for detecting electrical signals representing changes in inductance corresponding to the displacements of said strip in the direction of its thickness, determining the value of a difference between the signals from the two induction detectors by means of detectors corresponding to the amount of displacement of the metal strip in the direction of its thickness as determined with respect to said prescribed interval and squaring the differential value by means of square-law circuits to define the degree of elongation of the metal strip.

MORITADA KUBO
KUNIJI ASANO
INVENTORS

METHOD AND APPARATUS FOR DETECTING DURING OPERATION THE DEGREE OF ELONGATION OF ROLLED MAGNETIC METAL STRIPS

The present invention relates to a method and apparatus for determining during operation the degree of elongation of a rolled magnetic metal strip to control its form when it is rolled into a flat article.

When a metal strip is rolled, local different degrees of elongation of a rolled metal strip result in a deformed product. Such deformation presents itself in the form of undulations occurring on the surface of a metal strip. These undulations may be broadly classified into those appearing along the edge of a metal strip (hereinafter referred to as "edge undulations") and those occurring at the central part thereof (hereinafter referred to as "central undulations"). It is known to those skilled in the art that generation of such central or edge undulations can be prevented by crowning a work roll (or crown roll) or controlling its curvature. Before the form-control means can be effectively employed to obtain a flat metal strip, it is necessary to determine in advance the exact condition of undulations appearing on a metal strip just drawn out of the work roll assembly. However, accurate measurement of the degree of deformation presents practical difficulties, because the metal strip travels at a high speed and such measurement has to be made without mechanically touching the metal strip from the standpoint of preserving the durability of a measuring means.

Further, there are encountered the following problems in controlling the form of a metal strip. Namely, central and edge undulations occurring on the surface of a metal strip while it is being rolled do not assume a fixed pattern, but vary irregularly. Moreover, the degree of elongation of a metal strip and undulations have a complicated relationship. For example, when undulations have a great wavelength, the degree of elongation is small, though their amplitude may remain fixed, whereas when undulations have a short wave length, the degree of elongation becomes prominent. Moreover, a quickly travelling metal strip itself vibrates in the direction of its thickness, presenting more difficulties in defining its form.

It is accordingly an object of the present invention to provide a method and apparatus for determining during operation the degree of elongation of a rolled magnetic metal strip to control its thickness.

Another object of the invention is to provide a method and apparatus for determining during operation the deformation of a rolled magnetic metal strip which appears in the form of undulations, without being affected by its vibration in the direction of its thickness while it travels.

In brief, the present invention consists in disposing at the outlet side of a work roll assembly at a very small interval $\Delta x$ in the travelling direction of a rolled metal strip at least two induction detectors for detecting signals representing variations in inductance corresponding to the magnitude of its displacement in the direction of its thickness, treating output signals from said detectors using a bridge circuit, determining the value of a difference $\Delta y$ between the signals from the two detectors as obtained with respect to the aforesaid minute interval between the two detectors arranged in the travelling direction of the metal strip and squaring the differential value to find the degree of elongation of the metal strip from the squared value $(\Delta y)^2$.

Another feature of the present invention runs as follows. Determination is made by the aforesaid detectors of the value of a difference $\Delta y$ between the signals from the two detectors, or the amount of displacement of the metal strip in the direction of its thickness with respect to the interval $\Delta x$ between the detectors arranged in the longitudinal direction of the metal strip which is considerably smaller than the average length of undulations occurring in the longitudinal direction of the metal strip. Further said determination is repeated at a suitable number (preferably an $m$ number) of points distributed over a distance $m \Delta x$ (where $m$ is an integer) which is much longer than said average length of undulations. Values obtained by squaring the respective differential values are summed up by an addition circuit, thereby determining the degree of elongation of the metal strip with respect to the aforesaid distance $m \Delta x$ in the longitudinal direction of the metal strip.

This invention can be more fully understood from the following detailed description when taken in connection with reference to the accompanying drawings, in which.

Figure 1A:
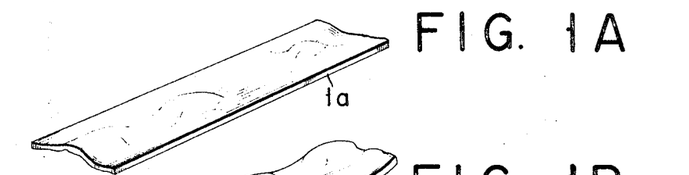
FIGS. 1A and 1B illustrate the pattern of undulations appearing on the surface of a metal strip.
Figure 1B:
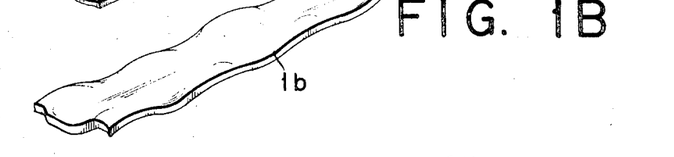

Before describing the present invention, reference is made to FIGS. 1A and 1B which illustrate central and edge undulations respectively.

There will not be described an embodiment of the present invention by reference to FIGS. 2 to 7 where the same parts are denoted by the same characters. First, reference is made of FIG. 4 which shows induction detectors for determining the amount of undulations with respect to a very small unit interval $\Delta x$ in the longitudinal direction of a metal strip and a circuit arrangement associated therewith. Numeral 1 represents that portion of a metal strip travelling in the direction of the indicated arrow which is drawn out of a work roll assembly before it is taken up by a suitable means. By way of simplifying description, there is used a set of intersecting $x$, $y$ and $z$ coordinates, in which the travelling direction of the metal strip is designated as an $x$ axis, the direction of its thickness as a $y$ axis and the transverse direction thereof as a $z$ axis. Along the $x$ axis substantially intersecting a point $Z_n$ on the $z$ axis of the metal strip 1 are arranged a pair of detectors 4 and 4' with a minute interval $\Delta x$ left therebetween. These detectors may consist of an automatic induction type prepared by winding a coil 3 about a U-shaped core 2. The aforesaid minute interval $\Delta x$ is so chosen as to be less than one half of the shortest wave length of undulations, which is experimentally defined from the standpoint of controlling the form of a metal strip. For example, a length of about 20 mm. is just what is desired for said interval $\Delta x$. On the other hand, the thickness of a rolled metal strip is generally of the order of, for example 0.2 mm. If this thickness becomes smaller, the interval $\Delta x$ may be reduced by that extent. Numeral 8 denotes a detection circuit arrangement which comprises a bridge circuit 5 whose adjacent two sides are formed of coils 3 and 3', an AC source 6 for energizing said bridge circuit 5, the frequency of said AC source 6 being preferred to be about 10 times the maximum vibration frequency of the metal strip, and a conversion means 7 for converting outputs from said bridge circuit 5 to signals corresponding to the condition of undulations of the metal strip. If the bridge 5 is previously brought to a balanced state under the condition where there is not introduced a metal strip, then the amplitude of outputs from the bridge 5 will vary with changes in the clearance between the detectors 4 and 4' and the underside of a metal strip brought in. In other words, outputs from the bridge 5 represent the signals obtained by amplitude modulation of inputs from the AC source 6 which may be deemed as a carrier. In this sense, numeral 7 denotes a demodulator which may consist of a rectifying circuit or synchronizing rectifying circuit. Again if the bridge 5 is brought to a balanced state in advance under the condition in which there is carried a metal strip into a detection circuit arrangement, then outputs from the bridge 5 will be subjected to phase modulation. To square the value of output signals from the demodulator 7 there is provided a square-law circuit 9. Outputs from this square-law circuit 9 represent values $(\Delta y)^2$ obtained by squaring the difference between the displacements of a metal strip in the direction of its thickness at two points across the aforesaid interval $\Delta x$.

Figure 3:
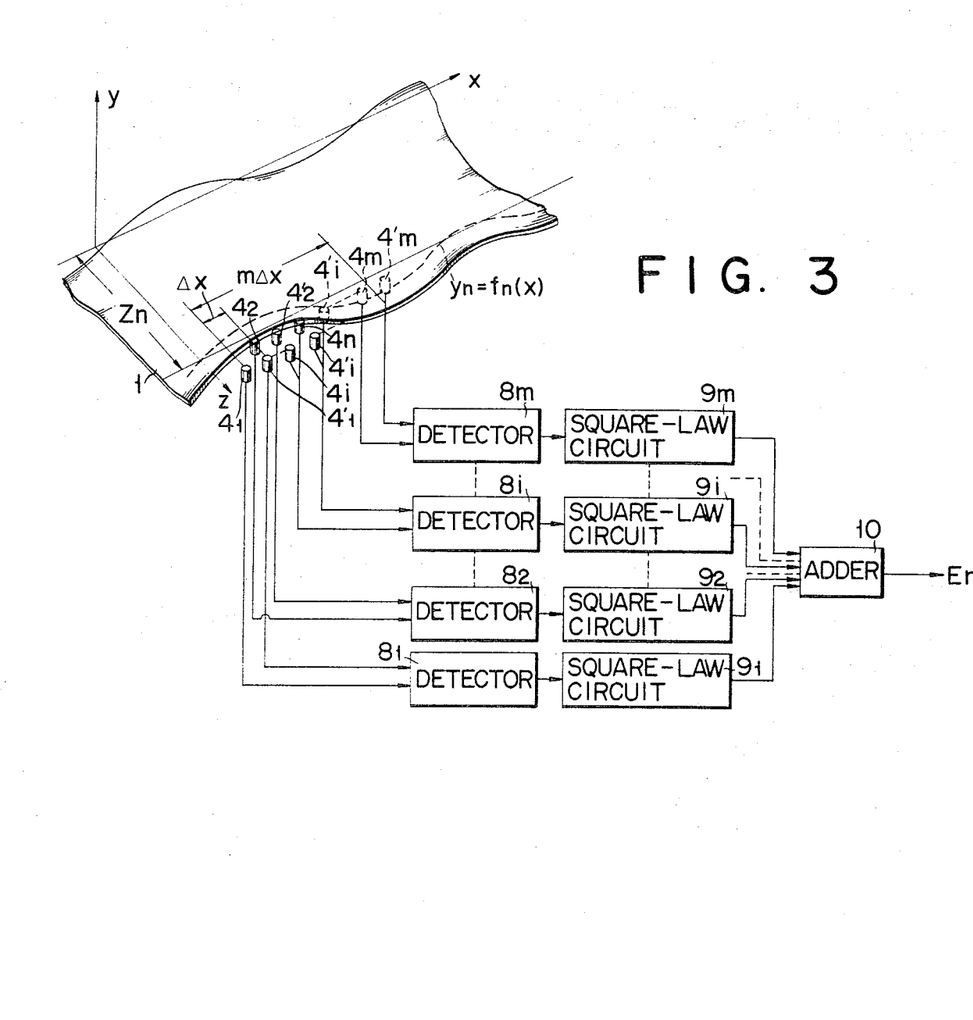
FIG. 3 is a detailed representation of the embodiment of FIG. 2.

Detectors, each pair of which constitutes a group, are disposed as illustrated in FIG. 3. Namely, there are arranged in the longitudinal direction of a metal strip an $m$ number of groups of detectors $4_i$ and $4_i'$...$m$ i and $4_i'$, or $4_m$ and $4_m'$ with an interval of substantially $\Delta x$ kept therebetween. The overall distance between the detectors $4_1$ and $4_m'$ is so chosen as to be larger than one half of the experimentally defined maximum wave length of undulations of a metal strip as viewed from the standpoint of controlling its form. While it is not always necessary for the detectors of each group to have the same interval, it is advantageous to dispose them at an equal space from the standpoint of manufacture and other considerations. To the respective groups of detectors are connected detection circuits $8_1$...$8_i$ or $8_m$ and square-law circuits $9_1$ ... $9_i$ or $9_m$. A sum $E_n$ of outputs from the square-law circuits is obtained by an addition circuit 10. As described later, a signal representing said sum $E_n$ denotes an aggregate of the differences in the degree of elongation at those parts of a metal strip along the $x$ axis which substantially pass points $z=Z_n$.

Figure 2:
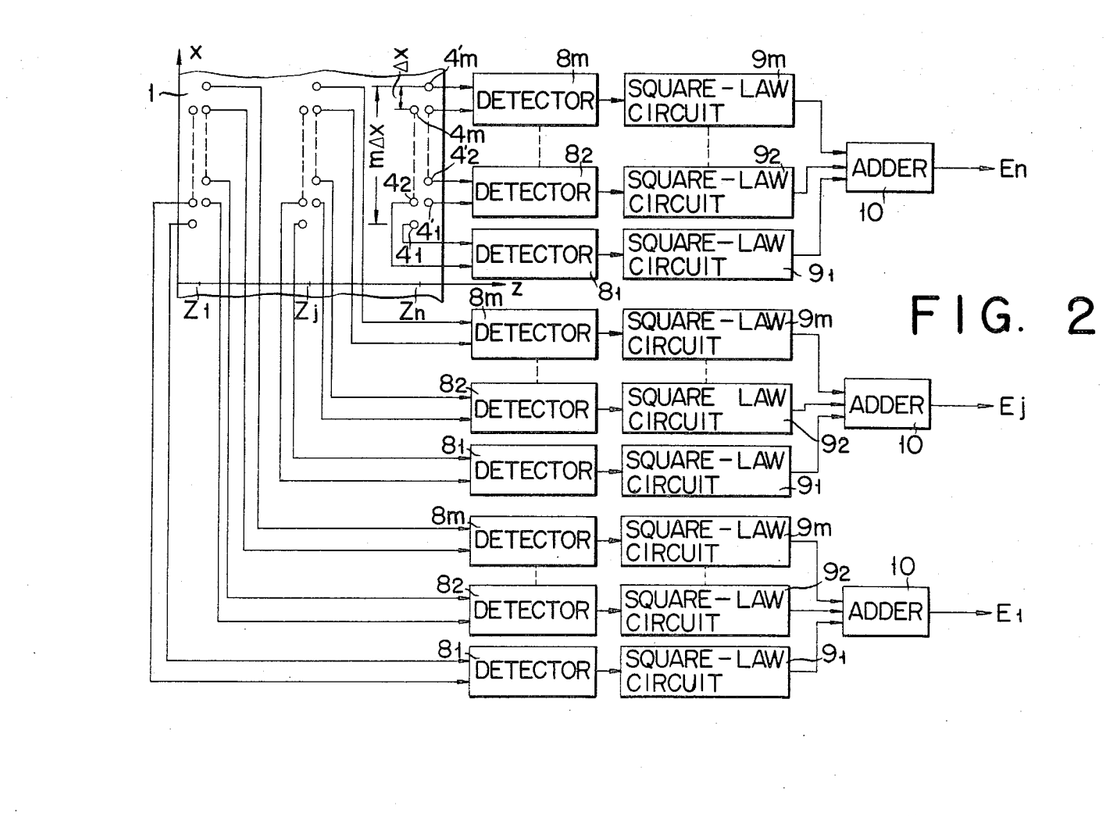
FIG. 2 is a schematic block diagram of an embodiment of the present invention.

FIG. 2 represents the case where it is attempted to determine the differences in the degree of elongation of a metal strip at points as broadly distributed as possible across its entire width. Namely, the FIG. presents an apparatus for determining the differences $E_t$, $E_i$ or $E_n$ in the degree of elongation at those parts of a metal strip along the $x$ axis which substantially pass points $z=Z$, $z=Z_i$ or $z=A_n$.

Figure 4:
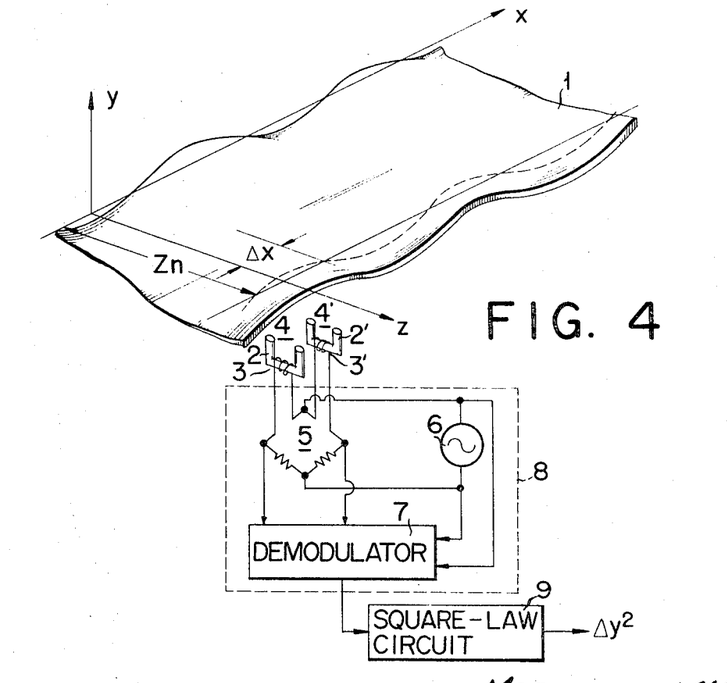
FIG. 4 presents an induction detector used in the embodiment of FIG. 2 and a schematic diagram of detection circuit.

There will now be described the principle underlying the aforesaid embodiment by which determination is made of the degree of elongation of a metal strip and the operation of an apparatus associated therewith. When a rolled metal strip 1 travels, the inductance of the coil 3 varies with the degree of displacement of said metal strip (changes in the value of $y$). The output $\Delta Y$ from the detection circuit is proportionate to the difference $\Delta y$ in the values of $y$ at two points across the interval $\Delta x$ between the two detectors along the $x$ axis and may be expressed by the equation 1 below.

$Y1kfi(0)-afi(\Delta x)]=\Delta yi$   1    where $k$ is a constant defined by the degree of amplification by the detection circuit 8 and other related factors. The output $\Delta Y$ is allowed to pass the square-law circuit 9 to obtain outputs represented by the following equation 2

$\Delta Y^2 k^2 \Delta A yi^2$    2

On the other hand, the degree of elongation $e$ of a metal strip presenting a curvature indicated by $y=fi(x)$ may be determined by the equation 3 below with respect to the minute unit interval $\Delta x$ on the surface of the metal strip along the $x$ axis.

$$e = \frac{\sqrt{1+\left(\frac{\Delta yi}{\Delta x}\right)^2} \cdot \Delta x - \Delta x}{\Delta x} \quad (3)$$

Undulations of a metal strip 1 generally have a considerably great wavelength in relation to their amplitude, and there results a relationship $(\Delta y/\Delta x) \ll 1$. Therefore the equation 3 may be closely approximated by the equation 4 below.

$$e \doteq \frac{1}{2}\left(\frac{\Delta yi}{\Delta x}\right)^2 = \frac{1}{2}\left(\frac{1}{\Delta x}\right)\Delta yi^2 \quad (4)$$

Assuming $$\frac{1}{2}\left(\frac{1}{\Delta x}\right) = k^2$$

(where $k$ is a constant) with respect to the equation 4 above, then the equation 4 will have exactly the same form as equation 2. This means that $\Delta Y^2$ of the equation 2, namely, outputs from the square-law circuit 9 denotes the degree of elongation of a metal strip.

Let us now consider the case where there are connected to the output side of the detection circuit 8 a differentiation circuit and square-law circuit. Assuming in this case that the deformation of a metal strip only takes the form of progressive waves, then outputs from the square-law circuit 9 will be proportionate to the degree of elongation of a metal strip. In many cases, however, there are also present standing waves $g(x)^{G(t)}$ (where $g(x)$ is a function of $x$ and $G(t)$ is a function of $t$). In case such standing waves commingle with other types of waves, then the output $Y$ from the detection circuit 8 of FIG. 4 will be $Yi=k[fi(vt)+g(x) \cdot G(t)]$    5 where $k$ is a constant. Electrically differentiated, the resultant output $Yi'$ will be $$Yi' = k\left[\frac{dfi(vt)}{dt} + g(x) \cdot \frac{dG(t)}{dt}\right] \quad (6)$$

The ordinary standing wave $g(x) \cdot G t)$ has a high frequency, though it has a considerably great wave length and conversely a small amplitude in relation to $fi(vt)$. Accordingly the second term in parenthesis of the equation 6 will assume such a prominently large value as can not be overlooked in relation to the first term primarily required in determining the degree of elongation, thus leading to errors of determination.

According to the method of the present invention, however, determination is made of the difference between the displacements $yi$ of a metal strip at two points across the minute unit length $\Delta x$ along the $x$ axis. Therefore, the outputs $\Delta Yi$ from the detection circuit will be $\Delta Yi=k[fi(0)-fi(\Delta x)+g(0)\cdot^{G(}\Delta x)-g(\Delta x)\cdot^{G(}t)]$
$=k[\Delta yi+(g(0)-g(\Delta x))\cdot^{G(}t)]$    7

Since the ordinary standing wave has a great wave length and small amplitude, as described above, there results $g(0)-g(\Delta x) \doteq 0$ in the equation 7, thus rendering the term representing the standing wave of the equation 7 unrelated to the magnitude of frequency and so negligible, and permitting the accurate determination of the degree of elongation of a metal strip. Where there occurs progressive and standing waves in overlapping relationship, the present invention displays a particularly advantageous functional effect.

Next, outputs from the detection circuit 8 of FIG. 4 includes, after electrical differentiation, a factor represented by the term $dfi(vt)/dt$ associated with the travelling speed $v$ of the metal strip as shown in the equation 6, so that where it is desired to determine the degree of its elongation, it is necessary to normalize said output with a signal denoting the travelling speed so as to eliminate the effect of said speed. However, the method of the present invention consists in determining the difference between the displacements $y(x)$ of a metal strip at two points across the minimum unit length $\Delta x$ in its longitudinal direction or along the $x$ axis, so that $\Delta yi$ included in the equation 7 is unrelated to the travelling speed of a metal strip, thus eliminating the necessity of normalizing the determined value with a signal representing said speed, and in consequence simplifying the arrangement of the detector means by that extent. Accordingly, the outputs $\Delta Yin$ from the square-law circuit 9 which squares the aforesaid difference in the degree of elongation may be expressed by the equation 8 below.

$\Delta Y1n = \Delta y1n^2$
$\Delta Y2n = \Delta y2n^2$
$\Delta Yin = \Delta yin^2$
$\Delta Ymn = \Delta Ymn^2$    8

When these outputs having an $m$ number are summed up by the addition circuit 10, then the output $E_n$ from said addition circuit 10 may be expressed by the equation 9 below.

$$E_n = \sum_{i=1}^{m} \Delta yin \quad 9$$

Figure 5:
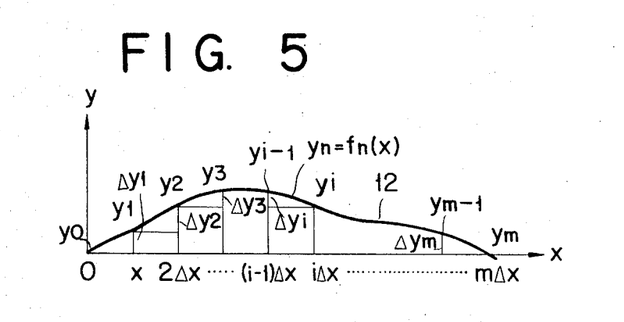
FIG. 5 shows the composite form of undulations caused by rolling on the surface of a metal strip in the direction of its thickness.

On the other hand, the degree of elongation of a metal strip 1 presenting a progressive wave indicated by $Yn = fn(x)$ at a given moment as shown in FIG. 5 with respect to a total length of determination $m\Delta x$ along the x axis may be approximately expressed by the equation 10 below using the values $yi(i = 0, 1, 2 \ldots m)$ of samples having a number of $(m = 1.)$ $$en = \frac{\sum_{i=1}^{m}\sqrt{1+\left(\frac{\Delta yin}{\Delta x}\right)}\Delta x - m\Delta x}{m\Delta x} \quad 10$$

Since undulations appearing on the surface of a metal strip have a considerably great wave length in relation to their amplitude, there results $(\Delta yin / \Delta x <<1$. Therefore, the equation 10 above may be approximately expressed by the equation 11 below.

$$en \doteq \frac{1}{2m\Delta x^2}\sum_{i=1}^{m}\Delta yin^2 \quad 11$$

Assuming $$\frac{1}{2m\Delta x^2} = k^2$$

, the equation 11 will have exactly the same form as the equation 9. Namely, the outputs $E_n$ from the addition circuit of FIG. 3 represents the degree of elongation of a metal strip with respect to the overall length of determination $m \Delta x$ along the x axis.

The reason why the unit length of determination $\Delta x$ is limited to less than one-half of the minimum wavelength of undulations appearing on the surface of a metal strip and the overall length of determination $m \Delta x$ to more than one-half of the maximum wavelength of said undulation is that it is desired to elevate the accuracy of determination even with respect to undulations having complicated waveforms. For example, with a high efficiency rolling apparatus which can roll at a velocity of 01,000 to 2,000 m/min, the vibrations of a metal strip in the direction of its thickness is far more complicated than when rolling is carried out at a lower velocity. Deformations or undulations appearing on the surface of a quickly travelling metal strip do not generally retain the originally generated form, but widely vary. Standing wave vibrations defined by the interval between the work rolls, the magnitude of tension applied to the metal strip and its elastic properties also commingle with said undulations. Moreover, the standing wave vibrations themselves vary in wave length and frequency. For these reasons, the functions associated with the form of the metal strip become quite irregular.

Figure 6:
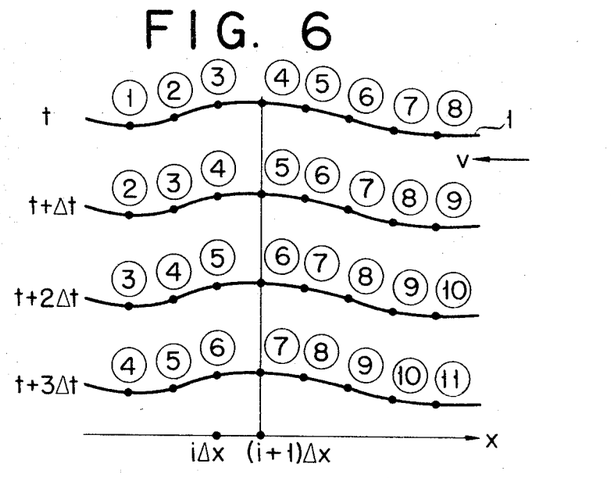
FIG. 6 presents the manner in which undulations progressively take place on the surface of a metal strip while it is being rolled.
Figure 7A:
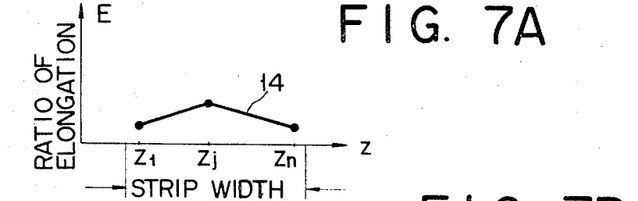
FIGS. 7A to 7C diagrammatically illustrate the operation of the embodiment of FIG. 2.
Figures 7B, 7C:
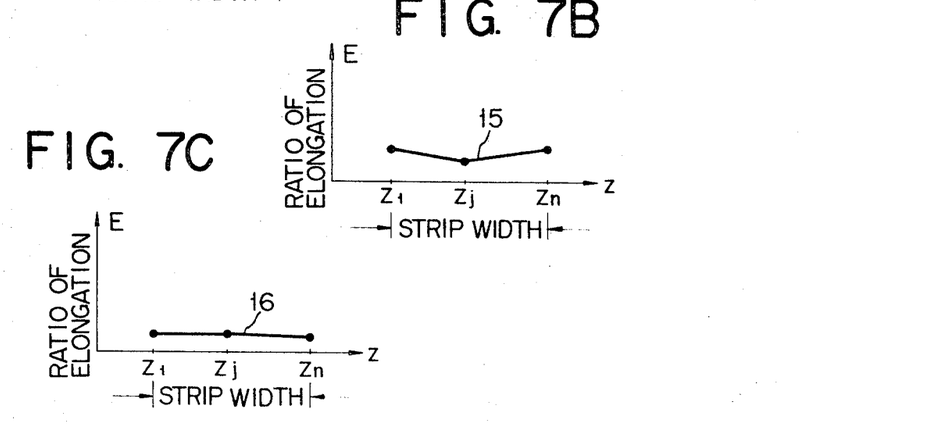

Observation by the inventors of this invention shows that although a metal strip 1 travels at a great velocity $v$ in the direction of the arrow as shown in FIG. 6, it often presents during a certain length of time an aspect as if it stood at rest as illustrated (numerals 1 to 11 denote the same parts of the metal strip) as can be observed with the flow of a river.

However, where determination is made, as is done by the present invention, of all undulations (including standing waves and progressive waves which are observed apparently not to shift, but actually travel) which occur on the surface of a metal strip in its longitudinal direction with respect to the overall length of determination corresponding to more than one-half of the experimentally defined maximum wavelength of such undulations, the aforementioned errors of determination is almost fully eliminated, with the resultant elevation of determining accuracy.

The foregoing description relates to the case where the degree of elongation of a metal strip was determined at a single point of the $z$ axis. However, if the degrees of elongation $E_1$, $E_i$ or $E_n$ at points $Z_1$, $Z_i$ or $Z_n$ on the $z$ axis as shown in FIG. 2, the values of these degrees of elongation will enable the overall form of a metal strip to be more exactly defined. Namely, if the degrees of elongation E have a distribution indicated by the waveform 14 of FIG. 7 it is seen that there will appear central undulations. In the case of the distribution represented by the waveform 15, there will occur edge undulations. And the waveform 16 shows that the metal strip has a flat surface. Accordingly, if the form of a rolled metal strip is automatically controlled according to the pattern of undulations associated with the degree of its elongation, it will be possible always to obtain a metal strip having excellent flatness.

Figure 8:
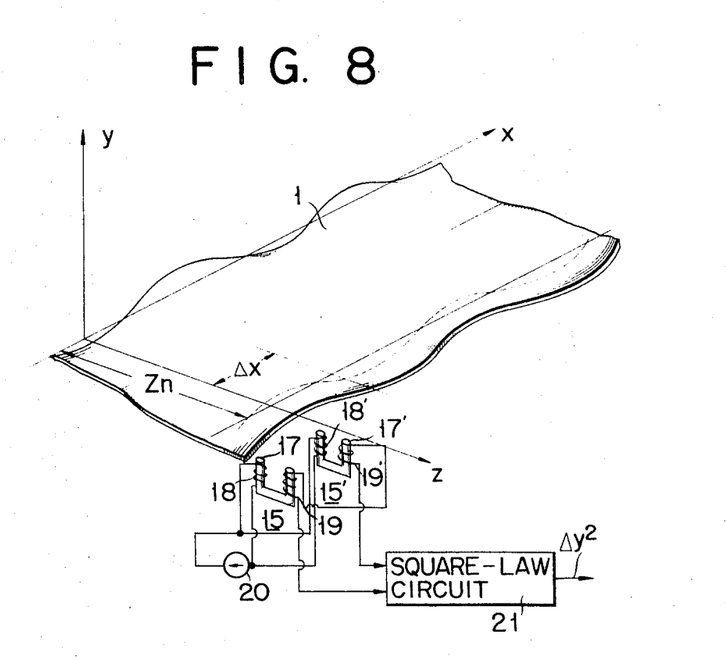
FIG. 8 indicates an induction detector modified from the embodiment of FIG. 2 and a circuit arrangement associated therewith.

The value $\Delta y^2$ obtained by squaring the difference between the degrees of elongation at two points across the minumum unit length $\Delta x$ can also be determined by an apparatus shown in FIG. 8. This apparatus is prepared by winding primary coils 18 and 18', and secondary coils 19 and 19' about magnetic cores 17 and 17' respectively. Determination by said apparatus is made by exciting the primary coils 18 and 18' by a source 20 of constant alternating current, connecting the secondary coils 19 and 19' in the opposite polarity, determining the difference $\Delta y$ between the degrees of elongation and squaring the value of said difference by a square-law circuit 21.

Figure 9:
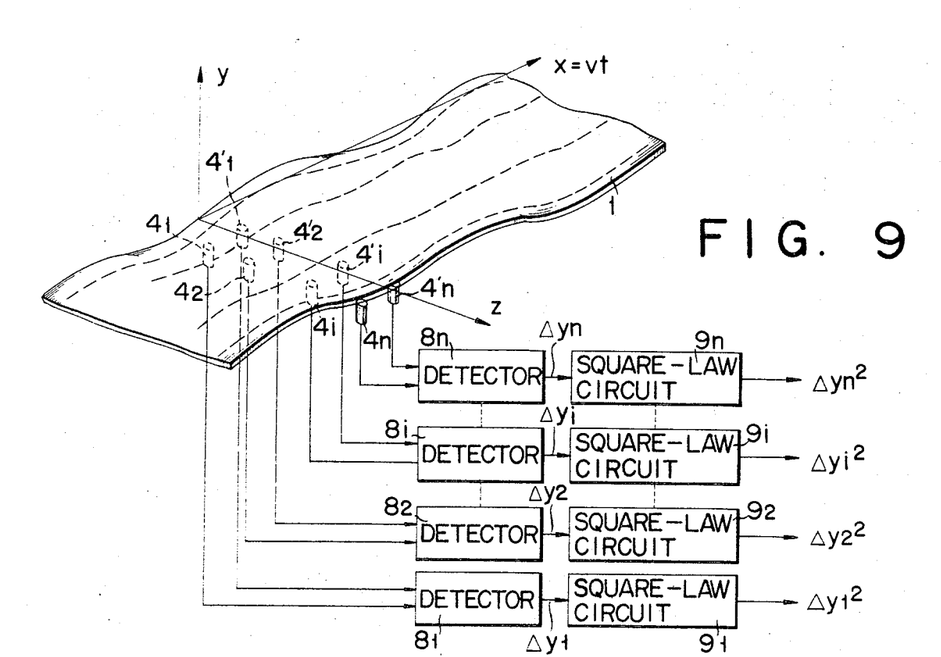
FIG. 9 is a diagram of another embodiment of the invention.

There will now be described by reference to FIG. 9 another embodiment of the present invention which may be deemed as a simplified form of the aforementioned embodiment. Where there occurs nonprogressive apparently resting waves as illustrated in FIG. 6, it is often sufficient to arrange only a single pair of detectors in the longitudinal direction of a metal strip, as illustrated in FIG. 9, because such waves have very few flat portions. As described above, undulations appearing on the surface of a metal strip are affected in a very much complicated manner by various factors such as the thickness of the metal strip, tension applied thereto, interval between a work roll assembly and guide roll, and travelling speed of the metal strip. Although, therefore, the apparatus of FIG. 2 may obviously be more excellent in terms of principle, it will be apparent that the embodiment of FIG. 9 which is of much simpler arrangement is preferable, if it is capable of fully effective determination for control of the form of a metal strip.

As mentioned above, the present invention can easily and exactly determine the degree of elongation of a metal strip having complicated patterns of undulations on its surface and moreover allows the determined values to be readily used in controlling the form of the metal strip.

What we claim is:

1. A method for determining during operation the degree of elongation of a rolled magnetic metal strip which comprises the processes of detecting at the outlet side of a work roll assembly signals representing changes in inductance corresponding to the displacements of said metal strip in the direction of its thickness at at least two points disposed at a prescribed interval in the travelling direction of the metal strip, determining the value of a difference between said two detected signals representing the amount of displacement of the metal strip in the direction of its thickness with respect to the aforesaid prescribed interval and squaring the differential value to obtain a signal denoting the degree of elongation of the metal strip.

2. A method for determining during operation the degree of elongation of a rolled magnetic metal strip which comprises the processes of detecting at the outlet side of a work roll assembly the value of a difference between the electrical signals representing changes in inductance corresponding to the displacements of said metal strip in the direction of its thickness as determined with respect to a longitudinal unit interval on the surface of the metal strip which is considerably shorter than the average wavelength of undulations occurring on said surface in the longitudinal direction thereof, said determination being repeated at a plurality of prescribed points distributed over a distance in the longitudinal direction which is much larger than the average wavelength of the aforesaid undulations, namely, is equal to an integral multiple of the aforementioned unit interval, squaring each of a plurality of differential values thus obtained and summing up said squared differential values thereby to obtain a signal representing the degree of elongation of the metal strip.

3. A method according to claim 1 wherein the process of detecting the two electrical signals and the difference therebetween comprises a process of obtaining electrical signals representing changes in inductance from two induction detecting circuits arranged at a prescribed interval in the travelling direction of the metal strip, a process of supplying outputs from said process to an AC bridge circuit and a process of demodulating the outputs from said AC bridge circuit.

4. A method according to claim 2 wherein the process of detecting the electrical signals and the difference therebetween comprises a process of obtaining electrical signals representing changes in inductance from two induction detecting circuits arranged at a prescribed interval in the travelling direction of the metal strip, a process of supplying outputs from said process to an AC bridge circuit and a process of demodulating the outputs from said AC bridge circuit.

5. A method according to claim 3 wherein the AC bridge circuit is previously brought to a balance state under the condition in which there is introduced a magnetic metal strip and there is involved a process of obtaining phase modulated outputs from said AC bridge circuit.

6. A method according to claim 3 wherein the AC bridge circuit is previously brought to a balanced state under the condition in which there is not introduced a magnetic metal strip and there is involved a process of obtaining amplitude modulated outputs from said AC bridge circuit.

7. An apparatus for determining during operation the degree of elongation of a rolled magnetic metal strip which comprises at least two induction detecting means arranged at a prescribed interval in the travelling direction of the metal strip for detecting at the outlet side of work roll assembly electrical signals representing changes in inductance corresponding to the displacements of the metal strip in the direction of its thickness, means for determining the value of a difference between the two detected signals corresponding to the amount of displacement of the metal strip in the direction of its thickness as determined with respect to the aforesaid interval and means for squaring said differential value to obtain a signal representing the degree of elongation of the metal strip.

8. An apparatus for determining during operation the degree of elongation of a rolled magnetic metal strip; which comprises means for detecting at the outlet side of a work roll assembly the value of a difference between the electrical signals representing changes in induction corresponding to the displacements of said metal strip in the direction of its thickness as determined with respect to a longitudinal unit interval on the surface of the metal strip which is considerably shorter than the average wavelength of undulations occurring on said surface in the longitudinal direction thereof, said determination being repeated at a plurality of prescribed points distributed over a distance in the longitudinal direction which is much longer than the average wavelength of said undulations, so as to represent an integral multiple of said unit interval, squaring means for squaring each of a plurality of differential values thus determined and adding means for summing up said squared values thereby to obtain a signal representing the degree of elongation of the metal strip.

9. A apparatus according to claim 7 wherein the at least two means for detecting electrical signals includes two induction detecting circuits arranged at a prescribed interval in the travelling direction of the metal strip and the means for detecting a difference between said signals comprises and AC bridge circuit which is supplied with outputs from said induction detecting circuits and a demodulator for demodulating the outputs from said AC bridge circuit.

10. An apparatus according to claim 8 wherein the means for detecting electrical signals includes two induction detecting circuits arranged at a prescribed interval in the travelling direction of the metal strip and the means for detecting a difference between said signals comprises an AC bridge circuit which is supplied with outputs from said induction detecting circuits and a demodulator for demodulating the outputs from said AC bridge circuit.